May 5, 1953  H. F. SWENSON  2,637,249
CLAMP
Filed July 9, 1949  2 SHEETS—SHEET 1
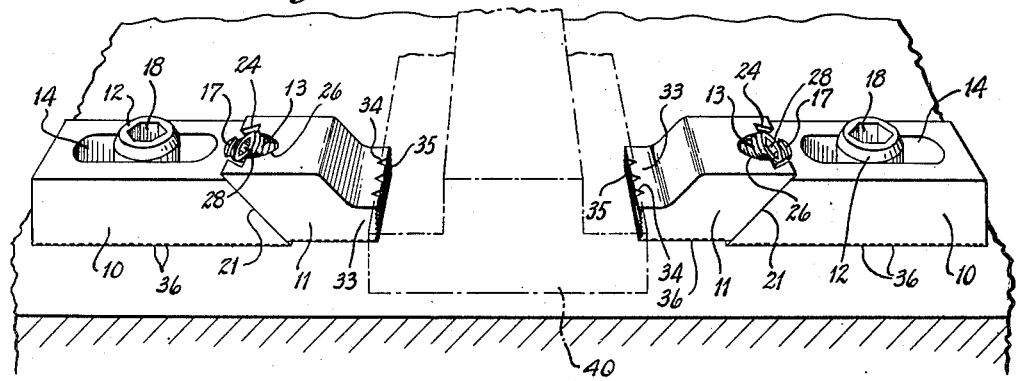
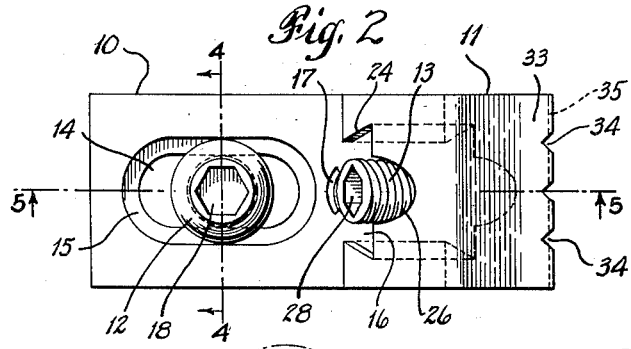
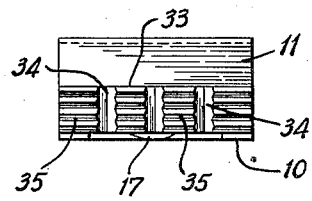
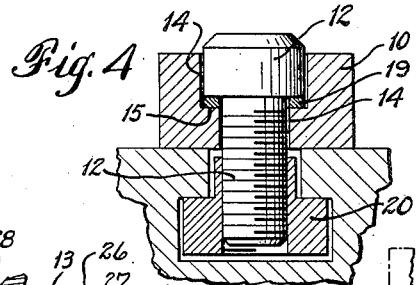
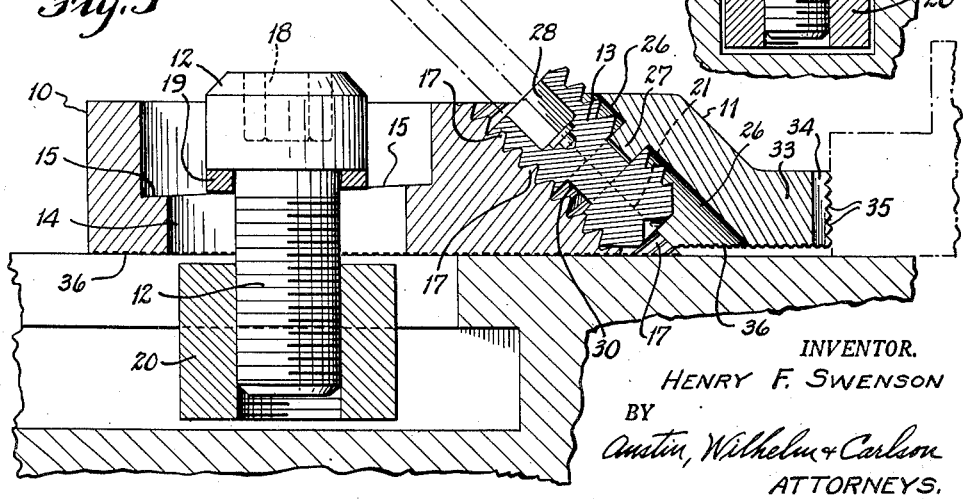
INVENTOR.
HENRY F. SWENSON
BY
Austin, Wilhelm & Carlson
ATTORNEYS.

May 5, 1953  H. F. SWENSON  2,637,249
CLAMP
Filed July 9, 1949  2 SHEETS—SHEET 2
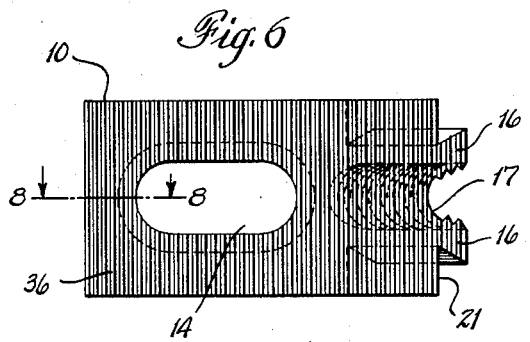
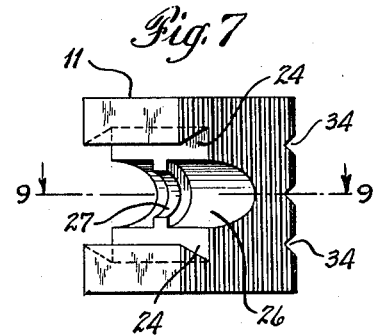
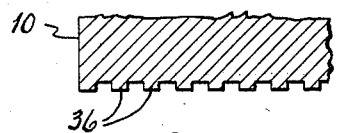
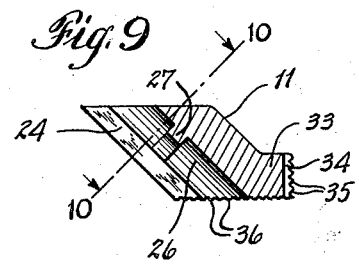
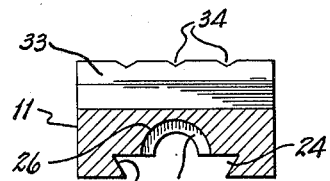
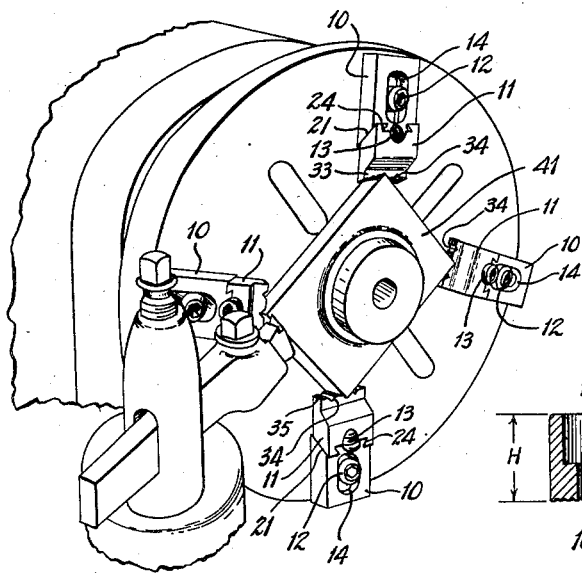
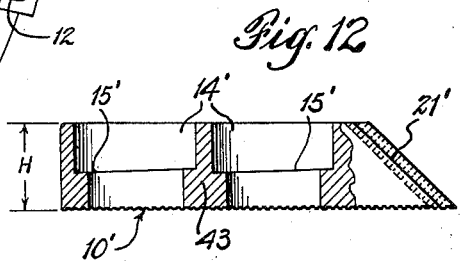
INVENTOR.
HENRY F. SWENSON
BY
Austin, Wilhelm & Carlson
ATTORNEYS.

Patented May 5, 1953

2,637,249

UNITED STATES PATENT OFFICE 2,637,249

CLAMP

Henry F. Swenson, West Orange, N. J.

Application July 9, 1949, Serial No. 103,806

1 Claim. (Cl. 90—59)

The invention relates, in general, to machine tools, and, more particularly, to clamps for holding a workpiece on the supporting surfaces of milling machines, planers, shapers, lathes, etc.

It is an object of the present invention to provide such a clamp which is simpler and more convenient to use; which is more efficient; which will hold the workpiece tightly against the face plate or machine table; which will hold many different kinds and shapes of work; and which will permit machining low edges or margins of the work.

According to a preferred form of the invention, the clamp comprises a main block adapted to be held firmly against the face plate or machine table; an adjustable jaw having a thin or low margin for engaging the side or corner of the work. The jaw is adjustable on the block by a dovetail, tongue-and-groove, slide arrangement; an adjustable screw is provided for this purpose. The slide axis is disposed at an angle of approximately 45° with the supporting surface. The jaw margin may have a plurality of notches to engage corners of the workpiece and also a series of transverse ridges for engaging the straight sides of the workpiece. The bottom of the block, and also of the jaw, may be provided with a series of transverse fluttings or serrations to bite into or grip the supporting surface of the machine. The block is provided with a recessed slot having a tapered shoulder against which the hold down bolt head seats. The tapered shoulder cooperates with the bottom serrations or flutings to tightly fix the block in position.

The invention also consists in certain new and original features and combinations hereinafter set forth and claimed.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawings forming a part hereof, in which:

Fig. 1 is a perspective, illustrating clamps according to the invention and one method of using them;

Fig. 2 is a plan view of one of the clamps;

Fig. 3 is an end view of one of the clamps, showing the teeth of the narrow holding jaw;

Fig. 4 is a transverse section on the line 4—4 of Fig. 2;

Fig. 5 is a longitudinal section on the line 5—5 of Fig. 2;

Fig. 6 is a bottom view of the block, taken separately, and showing the holding flutes or serrations;

Fig. 7 is a bottom view of the jaw, taken separately;

Fig. 8 is a detail exaggerating the holding flutes or serrations in the bottom of the block;

Fig. 9 is a section on the line 9—9 of Fig. 7;

Fig. 10 is a section on the line 10—10 of Fig. 7;

Fig. 11 is a perspective, illustrating one manner of using the machine clamps on a lathe; and Fig. 12 illustrates a modification in which the hold down slot comprises two aligned portions; this figure is a longitudinal central section taken through the block, corresponding to Fig. 5.

In the following description and in the claim, various details will be identified by specific names for convenience, but they are intended to be as generic in their application as the art will permit.

Like reference characters denote like parts in the several figures of the drawings.

In the drawings accompanying and forming part of the specification, certain specific disclosures of the invention are made for purposes of explanation, but it will be understood that the details may be modified in various respects without departure from the broad aspect of the invention.

Referring now to the drawings, the clamp comprises, in general, a block 10, an adjustable jaw 11, a hold down screw 12 for clamping the block to the supporting surface of a machine tool, and the adjusting screw 13 for adjusting the jaw against the work.

The block 10 has a longitudinal slot 14 whose upper end is enlarged, providing a shoulder 15. This shoulder 15 is inclined with respect to the parallel upper and lower surfaces of the block, as indicated particularly in Fig. 5. The block has an oblique forward face, indicated by 21, from which projects an oblique dovetail tongue 16. The tongue 16 is provided with a half bore having half screw threads 17, as indicated particularly in Figs. 5 and 6.

Fitting in slot 14 is the hold down screw 12; screw 12 has a hexagonal recess 18 in its head for operation by a plug wrench. Between the head of screw 12 and the tapered shoulder 15 is washer 19. The screw shank is threaded into the T-shaped slot nut 20 which engages in a T-slot of the supporting surface of the machine tool, as will be understood by those skilled in the art.

The jaw 11 has a dovetail groove 24 (Fig. 7) sliding over the dovetail tongue 16. The bottom of groove 24 is provided with a half bore 26. The bore 26 is a circular cylindrical surface throughout its length, except for the annular half flange 27. It will be understood that the threaded half bore 17, the plain half bore 26 and the axis of dovetail tongue 16 and dovetail groove 24 are laid out at a 45° angle with respect to the parallel planar upper and lower faces of the block 10 and jaw 11. The jaw 11 is slidably adjustable along the axis of the interfitting tongue 16 and groove 24 by the adjustable clamp screw 13.

Clamp screw 13 has a hexagonal recess 28, for the insertion of a plug wrench, as indicated particularly in Fig. 5. The clamp screw 13 is screw threaded throughout its entire circumference and length, except where the screw is interrupted by an annular groove 30.

It will be understood that the annular groove 30 of clamp screw 13 engages the half flange 27 on jaw 11, and that the screw threads on screw 13 engage the screw threads 17 on block 10; and that, by rotating clamp screw 13, the jaw 11 may be fed obliquely along the above-mentioned 45° angle.

The jaw 11 has substantially parallel upper and lower surfaces. It has an oblique front face terminating in a thin margin 33. The front face of margin 33 is provided with three vertical notches 34 providing teeth therebetween; these teeth are provided with a series of horizontal ridges 35 for biting into the work.

To assist in clamping the block 10 against the supporting surface of the machine tool, the lower surface of the block 10, and also of the jaw 11, is provided with a series of flutes or grooves; this provides a holding surface which will more efficiently grip the supporting surface without damaging it. These transversely extending flutes 36 may be formed in various ways. It is preferred to put them into the surface by a grinding tool. These flutes may be in the order of 1/64 inch wide, and from three thousandths to five thousandths deep.

The fluted holding surface 36 cooperates directly with the tapered shoulder 15 in that, after the block 10 is clamped against the supporting surface by turning hold down screw 12, any backward movement of block 10 causes the tapered surface shoulder 15 to ride under the head of screw 12 and more tightly force the fluted surface 36 against the supporting surface. It will be understood that the fluted surface forms a series of very fine teeth, or biting edges, which minutely grip or bite into the supporting surface under the pressure caused by the tapered shoulder 15. The cumulative effect of the large number of fluted grooves, each exerting a relatively small holding force, is sufficiently large to efficiently hold the block 10 against the supporting surface after the clamp is once adjusted.

The use of the clamp is thought to be obvious to those skilled in the art. It may be used to clamp a workpiece of almost any size or shape, quickly and firmly, against the face plate or table of the machine. Figs. 1 to 5 illustrate the use of the clamp with a machine such as a shaper or planer. Fig. 11 illustrates the use of the clamp on the face plate of a lathe.

In Figs. 1 to 5, two clamps are shown holding a T-shaped workpiece 40 in position. The slot nuts 20 are engaged in the usual T-slots of the table of the machine. The ridges 35 of the teeth engage the side edges of the workpiece 40. After clamping the blocks 10 in approximate position, the final adjustment is obtained by moving adjusting screw 13 to feed the jaws 11 the proper amount, to adjust the work 40 into proper position and clamp it there. The sharp ridges 35 bite into the work slightly and hold it firmly.

The jaws 11 are fed both downwardly toward the table, and inwardly toward the work, thus both clamping the work tightly between the clamps and downwardly against the table.

Fig. 11 shows four clamps for holding a workpiece centered on the face plate of a lathe. Here the corners of the workpiece 41 are held in one of the notches 34. The adjustment of the clamps is similar to that described above and will be obvious to those skilled in the art.

It will be noted that the entire clamp requires little head room so that it is possible to pass a tool over the entire clamp even when machining a low surface, provided the surface is higher than the clamp. In many cases, because of the lower, thin work-engaging margin, substantially lower surfaces may be machined right up close to the jaw.

All of the above features cooperate to provide a clamp requiring low head room. It will be noted that the 45° angle of slide provides a reasonably long, cooperating dovetail tongue and groove area; this gives substantial stability to the slide while keeping the thickness of the body of the clamp reasonably small. This enables the placing of a 45° face on the front of the jaw and the reduction of its thin margin to a thickness substantially one-half the thickness of the body of the clamp. The 45° adjustment angle also provides a convenient pressure ratio between pressure exerted in the direction parallel to the supporting surface and pressure exerted in a direction perpendicular to the supporting surface.

The clamping screw 12 and adjusting screw 13 are so related that one does not interfere with the other, even with the clamping screw engaged at the adjacent end of the slot 14. The edge of the head of screw 12 is beveled to insure this clearance.

The three holding notches 34 permit a choice in the position the clamp engages the work. This facilitates adjustment and use in tight places, where it may be otherwise difficult to find the proper position in which to anchor the clamp so as to properly engage the work.

The present jaw clamp can be used on many different machines and in many different machining operations. It may be used on lathes, planers, milling machines, drill presses, and other common machine tools. It may also be used on special production machinery.

When machining articles in mass production, one or two clamps may be left in permanent position and only the remaining clamp or clamps adjusted for loading and unloading the work. With such use it may be desirable to so adjust adjusting screw 13 of the "permanent" clamps that their jaws are forced down against the supporting surface. In this position the serrations or flutings on the bottom of the jaw help keep the clamp from slipping on the supporting surface.

It will be understood that, on comparatively rare occasions, because of the structure of some machines, or because of shape of the workpiece, the elongate slot 14 in Figs. 1 to 11 is not always long enough to reach a point where a slot nut 20 is located. The modification shown in Fig. 12 further minimizes such difficulty.

Referring now to Fig. 12 the longitudinal slot 14' is considerably longer than corresponding slot 14 in previous figures. The elongate slot 14' comprises, in effect, two separate parts 14' connected by a tie wall 43 to prevent spreading of the sides of the block 10'. Each slot part has its own inclined shoulder 15'. The tie wall is narrow enough so as not to interfere materially with the ability to locate the hold down screw (corresponding to 12) in any position along the extra long slot 14' as required by the machine or workpiece with which the clamp is used. In this form the height H of the block 10' is made greater than in the preceding figures; this gives a greater length to oblique forward face 21' and a greater range of movement to the adjustable jaw. This extended range of movement compensates for the aforementioned inability to utilize the entire length of extra long slot 14' because of the obstruction caused by tie wall 43.

It will be understood that the lengthened longitudinal slot 14' is primarily for the purpose of giving more latitude in positioning the block 10' on the machine; and that, ordinarily, only one hold down screw will be used. However, the use of two hold down screws, one in each slot portion, if desired, is not precluded. It will be understood that, except for the differences expressly pointed out, the modified form of block of Fig. 12 will have the same features and details of construction as described in Figs. 1 to 11; and that the use and advantages of the modification will be obvious from the discussion of Figs. 1 to 11.

While certain novel features of the invention have been disclosed herein, and are pointed out in the annexed claim, it will be understood that various omissions, substitutions and changes may be made by those skilled in the art without departing from the spirit of the invention.

What is claimed is:

A clamp for fixing the position of a workpiece on a plane smooth supporting surface, said clamp comprising a block having a generally plane bottom surface adapted to be secured to the supporting surface, a jaw slidably mounted on said block and adapted to engage the workpiece, means to adjust the jaw on the block, said block having a longitudinal slot extending toward said jaw with a hold down screw passing through the slot and engaging a part under the supporting surface, the upper end of the longitudinal slot being enlarged to receive the head of the hold down screw and to provide a tapered shoulder, said tapered shoulder extending at an angle with respect to said bottom surface and sloping away from said bottom surface toward said jaw, the head of said hold down screw being engageable with said tapered shoulder, the bottom surface of said block having a myriad of biting projections which, due to the thrust developed by the tapered shoulder acting against the head of said hold down screw, bite into and firmly engage the supporting surface.

HENRY F. SWENSON.

References Cited in the file of this patent

UNITED STATES PATENTS

| Number | Name | Date |
|---|---|---|
| Re. 22,641 | Barnes | May 15, 1945 |
| 664,688 | Suess | Dec. 25, 1900 |
| 733,044 | Hubner | July 7, 1903 |
| 999,978 | Fisher | Aug. 8, 1911 |
| 1,370,683 | Deater | Mar. 8, 1921 |
| 1,371,617 | Germanow | Mar. 15, 1921 |
| 1,938,337 | Janiszewski | Dec. 5, 1933 |

FOREIGN PATENTS

| Number | Country | Date |
|---|---|---|
| 5,432 | Great Britain | June 27, 1907 |
| 160,095 | Germany | Apr. 22, 1905 |
| 396,691 | Great Britain | Aug. 2, 1933 |